United States Patent
Lee et al.

(10) Patent No.: US 8,743,883 B2
(45) Date of Patent: Jun. 3, 2014

(54) APPARATUS AND METHOD FOR PARALLEL PROCESSING DATA FLOW

(75) Inventors: Jung Hee Lee, Daejeon (KR); Jung Sik Kim, Daejeon (KR); Young Ho Park, Daejeon (KR); Bhum Cheol Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 664 days.

(21) Appl. No.: 12/843,166

(22) Filed: Jul. 26, 2010

(65) Prior Publication Data

US 2011/0145276 A1 Jun. 16, 2011

(30) Foreign Application Priority Data

Dec. 10, 2009 (KR) .......................... 10-2009-0122437

(51) Int. Cl.
*H04J 1/02* (2006.01)
*H04L 12/56* (2006.01)

(52) U.S. Cl.
CPC ..................................... *H04L 47/10* (2013.01)
USPC ....................................................... 370/394

(58) Field of Classification Search
CPC ....................................................... H04L 47/10
USPC ................. 370/394, 230, 241, 250, 252, 389,
370/395.21, 401, 429, 468; 709/203, 220,
709/223, 224; 710/104; 713/1, 100, 323;
714/E11.207; 719/328; 707/E17.014;
718/104; 455/452.2

See application file for complete search history.

(56) References Cited

U.S. PATENT DOCUMENTS

| | | | |
|---|---|---|---|
| 6,542,508 B1 * | 4/2003 | Lin | 370/395.43 |
| 6,854,117 B1 * | 2/2005 | Roberts | 718/102 |
| 7,280,540 B2 * | 10/2007 | Halme et al. | 370/392 |
| 8,270,413 B2 * | 9/2012 | Weill et al. | 370/395.53 |
| 2004/0093513 A1 * | 5/2004 | Cantrell et al. | 713/201 |
| 2005/0190694 A1 * | 9/2005 | Ben-Nun et al. | 370/229 |
| 2006/0028986 A1 * | 2/2006 | Kwon et al. | 370/230 |
| 2008/0095170 A1 * | 4/2008 | Calvignac et al. | 370/394 |
| 2011/0145276 A1 * | 6/2011 | Lee et al. | 707/769 |

FOREIGN PATENT DOCUMENTS

| | | |
|---|---|---|
| JP | 7-231733 | 9/1995 |
| KR | 10-2008-0080669 | 9/2008 |

* cited by examiner

*Primary Examiner* — Phuongchau B Nguyen
(74) *Attorney, Agent, or Firm* — Nelson Mullins Riley & Scarborough LLP; Anthony A. Laurentano; Dipti Ramnarain

(57) ABSTRACT

Provided is a data flow parallel processing apparatus and method. The data flow parallel processing apparatus may include a flow discriminating unit to discriminate a flow of input first data, a processor allocating unit to allocate, to the first data, a processor that is not operating among a plurality of processors, a sequence determining unit to determine a sequence number of the first data when a second data having the same flow as the discriminated flow is being processed by any one processor composing the plurality of processors, and an alignment unit to receive the first data processed by the allocated processor and to output the received first data based on the determined sequence number.

12 Claims, 6 Drawing Sheets

| | FID | A/I |
|---|---|---|
| P1 | 100 | a |
| P2 | – | i |
| P3 | – | i |
| P4 | – | i |

117

| | FID | SNO |
|---|---|---|
| r1 | – | – |
| r2 | – | – |
| r3 | – | – |
| r4 | – | – |

($t_1$) INPUT FIRST DATA

| | FID | A/I |
|---|---|---|
| P1 | 100 | a |
| P2 | 200 | a |
| P3 | – | i |
| P4 | – | i |

| | FID | SNO |
|---|---|---|
| r1 | – | – |
| r2 | – | – |
| r3 | – | – |
| r4 | – | – |

($t_2$) INPUT SECOND DATA

| | FID | A/I |
|---|---|---|
| P1 | 100 | a |
| P2 | 200 | a |
| P3 | 100 | a |
| P4 | – | i |

| | FID | SNO |
|---|---|---|
| r1 | 100 | 2 |
| r2 | – | – |
| r3 | – | – |
| r4 | – | – |

($t_3$) INPUT THIRD DATA

| | FID | A/I |
|---|---|---|
| P1 | 100 | a |
| P2 | 200 | a |
| P3 | 100 | a |
| P4 | 100 | a |

| | FID | SNO |
|---|---|---|
| r1 | 100 | 3 |
| r2 | – | – |
| r3 | – | – |
| r4 | – | – |

($t_4$) INPUT FOURTH DATA

FIG. 4B

($t_A$) COMPLETE PROCESSING OF SECOND DATA

115

| | FID | A/I |
|---|---|---|
| P1 | 100 | a |
| P2 | – | i |
| P3 | 100 | a |
| P4 | 100 | a |

117

| | FID | SNO |
|---|---|---|
| r1 | 100 | 3 |
| r2 | – | – |
| r3 | – | – |
| r4 | – | – |

($t_5$) INPUT FIFTH DATA

| | FID | A/I |
|---|---|---|
| P1 | 100 | a |
| P2 | 200 | a |
| P3 | 100 | a |
| P4 | 100 | a |

| | FID | SNO |
|---|---|---|
| r1 | 100 | 3 |
| r2 | – | – |
| r3 | – | – |
| r4 | – | – |

($t_B$) COMPLETE PROCESSING OF THIRD DATA

| | FID | A/I |
|---|---|---|
| P1 | 100 | a |
| P2 | 200 | a |
| P3 | – | i |
| P4 | 100 | a |

| | FID | SNO |
|---|---|---|
| r1 | 100 | 2 |
| r2 | – | – |
| r3 | – | – |
| r4 | – | – |

($t_C$) COMPLETE PROCESSING OF FIRST DATA

| | FID | A/I |
|---|---|---|
| P1 | – | i |
| P2 | 200 | a |
| P3 | – | i |
| P4 | 100 | a |

| | FID | SNO |
|---|---|---|
| r1 | – | – |
| r2 | – | – |
| r3 | – | – |
| r4 | – | – |

| | FID | A/I |
|---|---|---|
| P1 | – | – |
| P2 | 200 | a |
| P3 | – | – |
| P4 | – | – |

117

| | FID | SNO |
|---|---|---|
| r1 | – | – |
| r2 | – | – |
| r3 | – | – |
| r4 | – | – |

($t_D$) COMPLETE PROCESSING OF FOURTH DATA

| | FID | A/I |
|---|---|---|
| P1 | – | – |
| P2 | 200 | a |
| P3 | 100 | a |
| P4 | – | – |

| | FID | SNO |
|---|---|---|
| r1 | – | – |
| r2 | – | – |
| r3 | – | – |
| r4 | – | – |

($t_6$) INPUT SIXTH DATA

| | FID | A/I |
|---|---|---|
| P1 | – | – |
| P2 | 200 | a |
| P3 | – | – |
| P4 | – | – |

| | FID | SNO |
|---|---|---|
| r1 | – | – |
| r2 | – | – |
| r3 | – | – |
| r4 | – | – |

($t_E$) COMPLETE PROCESSING OF SIXTH DATA

| | FID | A/I |
|---|---|---|
| P1 | – | i |
| P2 | – | i |
| P3 | – | i |
| P4 | – | i |

| | FID | SNO |
|---|---|---|
| r1 | – | – |
| r2 | – | – |
| r3 | – | – |
| r4 | – | – |

($t_F$) COMPLETE PROCESSING OF FIFTH DATA

APPARATUS AND METHOD FOR PARALLEL PROCESSING DATA FLOW

CROSS-REFERENCE TO RELATED APPLICATION

This application claims the benefit of Korean Patent Application No. 10-2009-0122437, filed on Dec. 10, 2009, in the Korean Intellectual Property Office, the disclosure of which is incorporated herein by reference.

BACKGROUND

1. Field of the Invention

The present invention relates to a data flow parallel processing apparatus and method, and more particularly, to a data flow parallel processing apparatus and method that may process data at high speed while maintaining a sequence of data, regardless of a number of flows of data.

2. Description of the Related Art

A data processing apparatus may be expected to perform high speed data processing, and thus, the data processing apparatus may use a processor array including a plurality of processors to perform parallel processing of data. In this case, maintaining a sequence of input data is important when the data processing apparatus processes the data at high speed.

As a parallel processing method that may maintain the sequence of input data while performing the data processing at high speed, a data processing apparatus that allocates data to a processor for each flow of the data to process the data has been disclosed.

The disclosed data processing apparatus discriminates a flow of data, generates flow identification information, and determines whether other data having the same flow is processed by a processor based on the flow identification information. The disclosed data processing apparatus allocates the data to an idle processor that is not processing to process the data, when the other data having the same flow is not processed. Conversely, when the other data having the same flow is processed by the processor, the disclosed data processing apparatus awaits until the processing of the other data having the same flow is completed, and then may allocate the data to the processor to process the data.

The disclosed data processing apparatus appropriately performs the data processing when a number of flows is greater than a number of processors, and a bandwidth of each flow is low. However, when the number of the flows is less than the number of processors or a bandwidth of a flow exceeds a bandwidth that a single processor may handle, a performance may no longer increase and a plurality of idle processors may not be operating while the other data having the same flow is processed, and thus, efficiency may decrease.

SUMMARY

An aspect of the present invention provides a data flow parallel processing apparatus and method that determines a sequence of input data when data having the same flow as the input data is being processed by any one processor composing a plurality of processors, and outputs the input data parallel-processed by the plurality of processors based on the determined sequence and thus, may process data at high speed and may maintain the sequence.

According to an aspect of the present invention, there is provided an apparatus of parallel processing a data flow, and the apparatus may include a flow discriminating unit to discriminate a flow of input first data, a processor allocating unit to allocate, to the first data, a processor that is not operating among a plurality of processors, a sequence determining unit to determine a sequence number of the first data when a second data having the same flow as the discriminated flow is being processed by any one processor composing the plurality of processors, and an alignment unit to receive the first data processed by the allocated processor and to output the received first data based on the determined sequence number.

According to an aspect of the present invention, there is provided a method of parallel processing a data flow, and the method includes discriminating a flow of input first data, determining whether data have the same flow as the discriminated flow is being processed by any one processor composing a plurality of processors, determining a sequence number of the first data when the data is being processed, and allocating, to the first data, a processor that is not operating among the plurality of processors, and outputting, based on the determined sequence number, the first data processed by the allocated processor.

Additional aspects, features, and/or advantages of the invention will be set forth in part in the description which follows and, in part, will be apparent from the description, or may be learned by practice of the invention.

EFFECT

According to embodiments of the present invention, a data flow parallel processing apparatus and method determines a sequence of input data when data having the same flow as the input data is being processed by any processor of a plurality of processors, outputs the input data parallel-processed by the plurality of processors based on the determined sequence, and thus, may process data at high speed and may maintain the sequence.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 4A through 4C illustrates examples of records of a processor state database and a sequence database based on data processing of FIG. 3.

DETAILED DESCRIPTION

Figure 1:
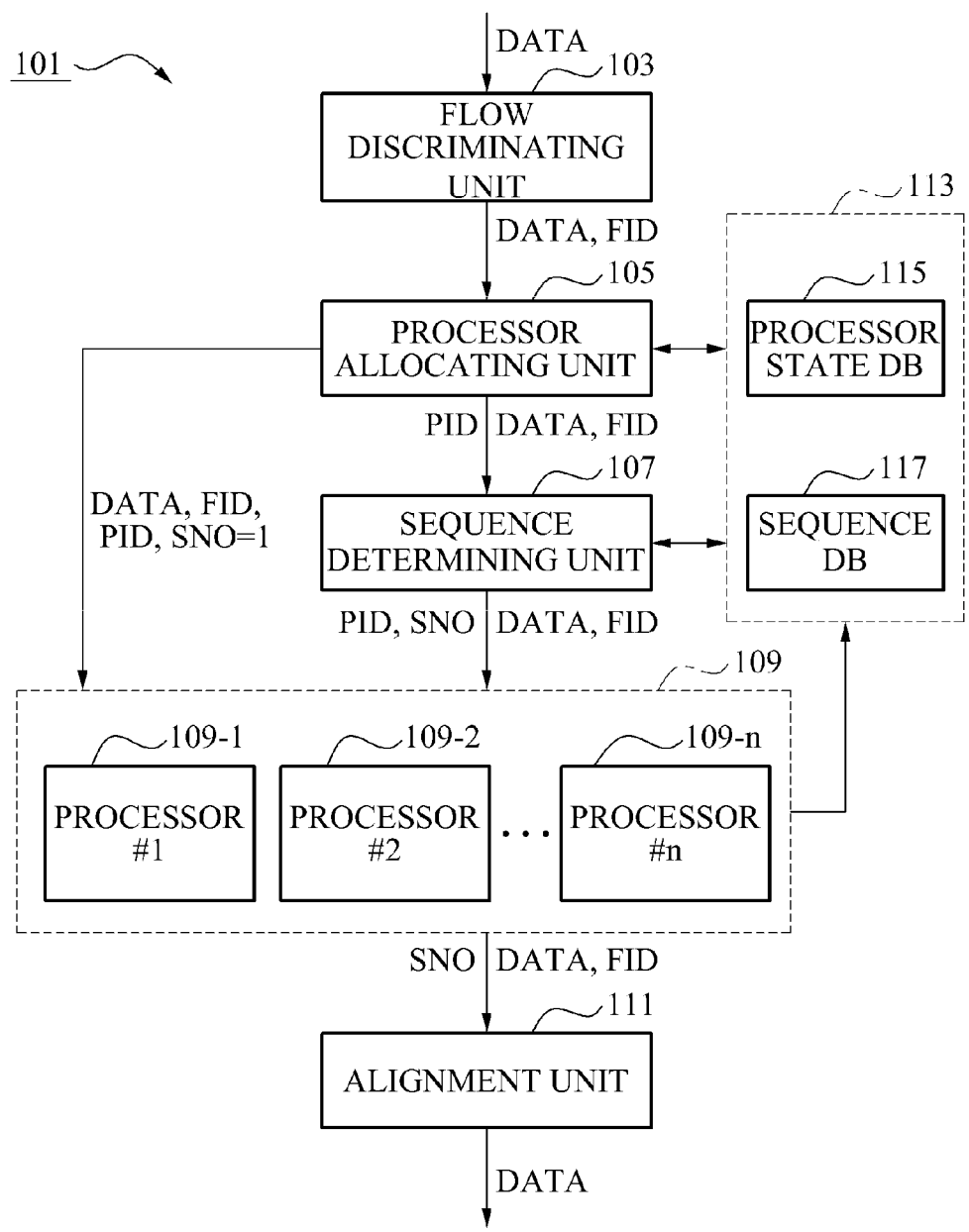
FIG. 1 is a diagram illustrating a configuration of a data flow parallel processing apparatus according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a configuration of a data flow parallel processing apparatus according to an embodiment.

Referring to FIG. 1, a data flow parallel processing apparatus 101 may include a flow discriminating unit 103, a processor allocating unit 105, a sequence determining unit 107, a processor array 109, an alignment unit 111, and a database 113.

The flow discriminating unit 103 may discriminate a flow of input first data. The flow discriminating unit 103 may discriminate the flow of the first data based on a predetermined classification standard, and may generate flow identification information (FID) with respect to the discriminated flow.

The processor allocating unit 105 may receive the first data and the FID, and may allocate, to the first data, a processor that is not operating among a plurality of processors. In this case, the processor allocating unit 105 may search for a processor in an 'idle state' with reference to the processor state database 115 where an operation state of each of the plurality of processors is recorded, and may generate processor identification information (PID) with respect to the retrieved processor.

When the processor is allocated to the first data, the processor allocating unit 105 may switch a state of the allocated processor, and may record, in the processor state database 115, the state as an 'active state'.

The sequence determining unit 107 may receive the first data and the FID, and may determine a sequence number of the first data when second data having the same FID is being processed by any one processor composing a plurality of processors 109_1 through 109_n. In this case, the sequence determining unit 107 may search for, based on the discriminated flow, the sequence number corresponding to the first data with reference to the sequence database 117, and may generate sequence number identification information (SNO) of the first data based on the retrieved sequence number. In this case, the sequence number recorded in the sequence database 117 may be recorded by the processor array 109, and the sequence number may correspond to a number of data having the same FID, the data being processed by any one processor composing the plurality of processors 109_1 through 109_n.

The sequence determining unit 107 may generate a next sequence number of the retrieved sequence number as the SNO, and may record the generated SNO in the sequence database 117. For example, when the retrieved sequence number is '2', the next sequence number, '3', may be generated as the SNO.

The processor array 109 may include the plurality of processors 109_1 through 109_n, and may enable a processor that is allocated to the first data to process the first data received from the processor allocating unit 105 or the sequence determining unit 107. Specifically, the processor array 109 may receive the first data, the FID, and the PID from the processor allocating unit 105. In this case, the sequence number of the first data received from the processor allocating unit 105 may be a predetermined initial value, for example, '1'.

The processor array 109 may receive the first data, FID, the PID, and the SNO from the sequence determining unit 107. In this case, the sequence number of the first data received from the sequence determining unit 107 may be a sequence of data output from the alignment unit 111 after the data is processed.

A state of processors among the plurality of processors 109_1 through 109_n of the processor array 109 that do not process data at an initial time may be recorded as 'idle state' in the processor state database 115. The idle state indicates a state where data is not processed.

When processors among the plurality of processors 109_1 through 109_n of the processor array 109 are in an 'active state', the processors may process the first data. When the processing is completed, the processors may return the state into the 'idle state' and may record, in the processor state database, the idle state.

In this case, a data process time of each of the plurality of processors 109_1 through 109_n may vary depending on a size of data and a type of data.

When the processing is completed, the processors among plurality of processors 109_1 through 109_n of the processor array 109 may search for, based on the discriminated flow, a sequence number with respect to the first data with reference to the sequence database 117, and may record, in the sequence database 117, a previous sequence number of the retrieved sequence number. For example, when the retrieved sequence number is '5', the processors may generate the previous sequence, '4', as the SNO, and may record the SNO in the sequence database 117.

The alignment unit 111 may receive the first data processed by the allocated processor and may output the first data based on the sequence number. The alignment unit 111 may receive the first data processed by the allocated processor, the FID, and the SNO, and may align the first data based on the SNO for each FID to output the first data In this case, the SNO with respect to the determined sequence number is a predetermined initial value, the alignment unit 111 may output the first data regardless of the sequence number.

The database 113 may include the processor state database 115 and the sequence database 117.

The processor state database 115 may record the state of the processor as an 'active state' or an 'idle state' based on whether the processor is processing the data.

The sequence database 117 may record the sequence number generated based on a sequence a sequence number of data having the same flow, namely, based on a number of data having the same flow, the data being processed by any one processor composing the plurality of processors.

When data having the same flow as a flow of input data is being processed by any one processor composing a plurality of processors, the data flow parallel processing apparatus according to an embodiment may align the input data that are parallel-processed by the plurality of processors using SNO of the input data with respect to the same flow, and thus may process the data at high speed and maintain a sequence of data, regardless of a number of flow of the data.

Figure 2:
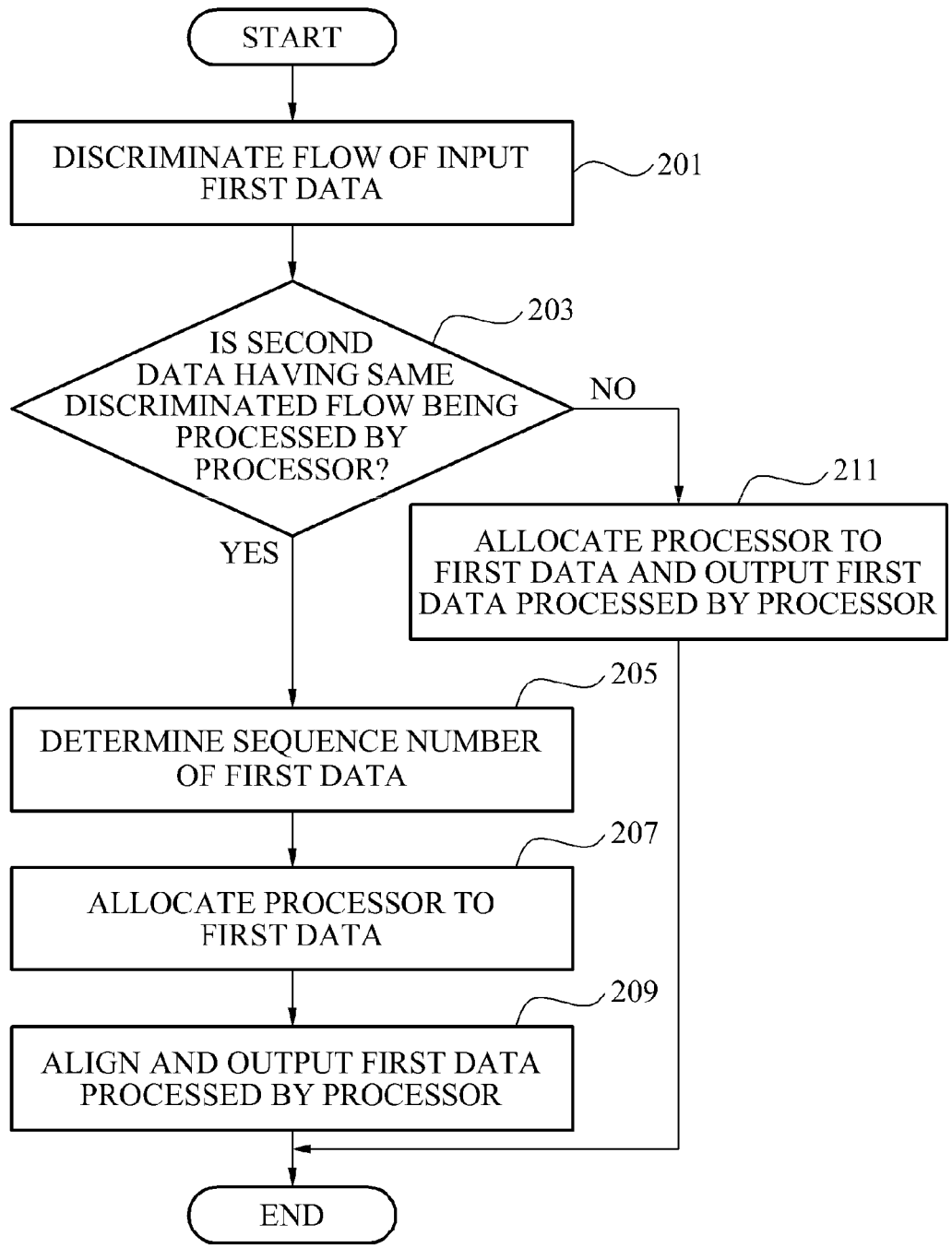
FIG. 2 is a flowchart illustrating a data flow parallel processing method according to an embodiment of the present invention.

FIG. 2 illustrates a data flow parallel processing method according to an embodiment. For ease of descriptions, it is assumed that an operation state of each processor is recorded in a processor state database, and a number of data being processed by each processor for each flow is recorded in a sequence database.

Referring to FIG. 2, the data flow parallel processing apparatus discriminates a flow of input first data in operation 201.

The data flow parallel processing apparatus may discriminate the flow of the input first data, and may generate FID with respect to the discriminated flow.

The data flow parallel processing apparatus determines whether second data having the same flow as the discriminated flow is being processed by any one processor composing a plurality of processors in operation 203.

The data flow parallel processing apparatus may determine whether the second data having the same FID is being processed by any one processor composing the plurality of processors with reference to a sequence database where a sequence number of data having the same flow is recorded for each flow.

When the second data having the same FID is being processed by any one processor composing the plurality of the processors, the data flow parallel processing apparatus determines a sequence number of the first data in operation 205.

The data flow parallel processing apparatus may search for, based on the discriminated flow, the sequence number corresponding to the first data with reference to the sequence database where a sequence database where a sequence number of data having the same flow is recorded for each flow. The sequence number may correspond to a number of data having the same FID, the data being processed by any one processor composing a plurality of processors.

The data flow parallel processing apparatus may generate SNO of the first data based on the retrieved sequence number. In this case, when the retrieved sequence number is '2', the data flow parallel processing apparatus may generate a next sequence number, '3', as the SNO, and may record the SNO in the sequence database.

The data flow parallel processing apparatus allocates, to the first data, a processor that is not operating among the plurality of processors in operation 207.

The data flow parallel processing apparatus may search for a process in an 'idle state' with reference to the state database where an operation state of each of the plurality of processors is recorded, and may generate PID with respect to the retrieved processor.

When the processor is allocated to the first data, the data flow parallel processing apparatus may switch a state of the allocated processor, and may record the state as an 'active state' in the processor state database.

The data flow parallel processing apparatus may process the first data using the processor allocated to the first data. In this case, the data flow parallel processing apparatus may process the first data using a processor in the 'active state'. When the processing is completed, the data flow parallel processing apparatus may return the state of the processor to the 'idle state' again, and may record the state of the processor to the 'idle state'.

The data flow parallel processing apparatus may process the first data, and when the processing of the first data is completed, the data flow parallel processing apparatus may search for a sequence number with respect to the first data based on the discriminated flow, and may record a previous sequence number of the retrieved sequence number in the sequence database. For example, when the retrieved sequence number is '5', the data flow alignment processing apparatus may generate the previous sequence number, '4' as the SNO to record the SNO in the sequence database.

The data flow parallel processing apparatus aligns the first database processed by the allocated processor to output the first data in operation 209.

The data flow parallel processing apparatus may receive the first data processed by the allocated processor, the FID, and the SNO, and may align the first data based on the SNO for each FID to output the first data.

In this case, when the sequence number of the first data is not determined or when the SNO with respect to the determined sequence number is a predetermined initial value, the data flow parallel processing apparatus may output the first data regardless of a sequence.

When the second data having the same flow is not being processed by a processor, the data flow parallel processing apparatus allocates a processor to the first data, and outputs the first data processed by the allocated processor in operation 211.

In this case, the data flow parallel processing apparatus may not determine the sequence number of the first data, and may allocate, to the first data, a processor that is not operating among the plurality of processors. The data flow parallel processing apparatus may output the first data processed by the allocated processor regardless of the sequence.

Figure 3:
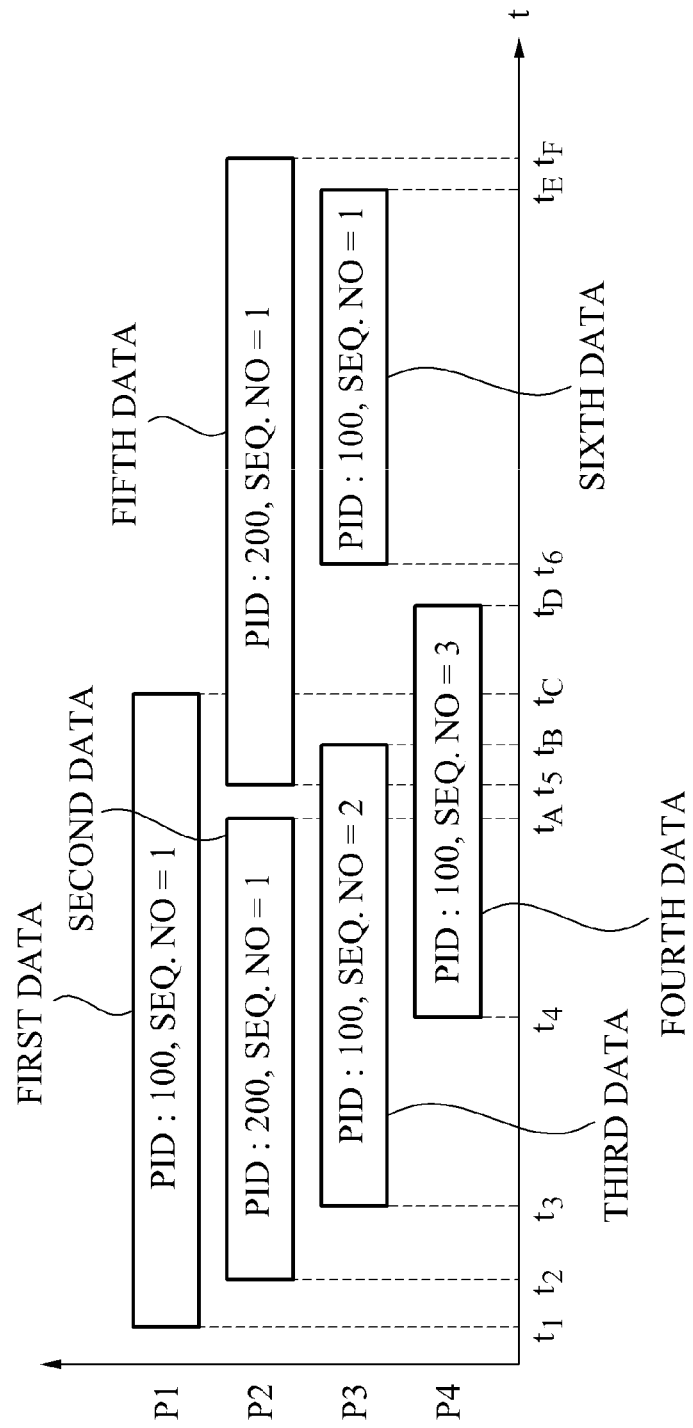
FIG. 3 is a diagram illustrating an input/output time of each data to describe an example of a data flow parallel processing method according to an embodiment of the present invention.

FIG. 3 illustrates an input/output time of each data to describe an example of a data flow parallel processing method according to an embodiment. FIGS. 4A through 4C illustrates examples of records of a processor state database and a sequence database based on data processing of FIG. 3.

Referring to FIG. 3, and FIGS. 4A through 4C, a data flow parallel processing apparatus may allocate a processor #1 (P1), a processor #2 (P2), a processor #3 (P3), a processor #4 (P4), the processor #2 (P2), and the processor #3 (P3) to six input data having different sizes, respectively, at $t_1, t_2, t_3, t_4, t_5,$ and $t_6$, and may output data processed by each of the processors in a sequence of P2, P3, P1, P4, P3, and P2 at $t_A, t_B, t_C, t_D, t_E,$ and $t_F$.

When first data of which FID is 100 is inputted at $t_1$, the data flow parallel processing apparatus may allocate P1 to the first data, and may record, in the processor state database 115, a state of P1 as an 'active state'. In this case, the data flow parallel processing apparatus may determine that data of which FID is 100 is not being processed with reference to the processor state database 115, a sequence number of the first data of which the FID is 100 may not be recorded in the sequence number 117 database.

When third data of which FID is 100 is inputted at $t_3$, the data flow parallel processing apparatus may allocate P3 to the third data, and may record a state of P3, in the processor state database 115, as the 'active state'. In this case, the data flow parallel processing apparatus may determine that data of which FID is 100 is being processed with reference to the processor state database 115, and may record, in the sequence database 117, a sequence number of the third data as '2'.

When processing of the third data of which FID is 100 is completed by P3 at $t_B$, the data flow parallel processing apparatus may record, in the processor state database 115, the state of P3 as an 'idle state' again. In this case, the data flow parallel processing apparatus may correct the sequence number of the third data of which FID is 100 from '3' to '2' and may record, in the sequence database 117, the corrected sequence number '2'.

Records of databases may be recorded based on data input/output for each point of time in the same manner as the above descriptions and thus, detailed descriptions thereof are omitted.

The data flow parallel processing method may process data at high speed and may maintain a sequence of data based on SNO regardless of size of input data.

The method according to the above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus of parallel processing a data flow, the apparatus comprising:
   a flow discriminating unit to discriminate a flow of input first data;
   a processor allocating unit to allocate, to the first data, a processor that is not operating among a plurality of processors;
   a sequence determining unit to determine a sequence number of the first data when a second data having the same flow as the discriminated flow is being processed by any one processor composing the plurality of processors, wherein the sequence determining unit searches for, based on the discriminated flow, the sequence number corresponding to the first data from a sequence database, and generates sequence number identification information of the first data based on the retrieved sequence number wherein the sequence determining unit generates a next sequence number of the retrieved sequence number as the sequence number identification information, and records the generated sequence number identification information in the sequence database; and
   an alignment unit to receive the first data processed by the allocated processor and to output the received first data based on the determined sequence number.

2. The apparatus of claim 1, wherein the flow discriminating unit generates flow identification information with respect to the discriminated flow.

3. The apparatus of claim 1, wherein the processor allocating unit searches for a processor in an 'idle state' with reference to a processor state database where an operation state of each of the plurality of processors is recorded, and generates processor identification information with respect to the retrieved processor.

4. The apparatus of claim 1, wherein the processor allocating unit performs:
   switching a state of the allocated processor to an 'active state' in response to the allocation to the first data; and
   returning the state of the allocated processor to an 'idle state' when the processing with respect to the first data is completed.

5. The apparatus of claim 1, wherein the processor processes the first data, and, when the processing is completed, searches for the sequence number of the first data with reference to the sequence database and records a previous sequence number of the retrieved sequence number in the sequence database.

6. The apparatus of claim 1, wherein the alignment unit outputs the first data regardless of the determined sequence number when sequence number identification information with respect to the determined sequence number is a predetermined initial value.

7. A method of parallel processing a data flow, the method comprising:
   discriminating a flow of input first data;
   determining whether data having the same flow as the discriminated flow is being processed by any one processor composing a plurality of processors;
   determining a sequence number of the first data when the data is being processed, and allocating, to the first data, a processor that is not operating among the plurality of processors;
   searching for, based on the discriminated flow, the sequence number corresponding to the first data from a sequence database;
   generating sequence number identification information of the first data based on the retrieved sequence number wherein the generating comprises generating a next sequence number of the retrieved sequence number as the sequence number identification information, and records the generated sequence number identification information in the sequence database; and
   outputting, based on the determined sequence number, the first data processed by the allocated processor.

8. The method of claim 7, wherein the discriminating comprises:
   generating flow identification information with respect to the discriminated flow.

9. The method of claim 7, wherein the allocating comprises:
   searching for a processor in an 'idle state' with reference to a processor state database where an operation state of each of the plurality of processors is recorded, and generating processor identification information with respect to the retrieved processor.

10. The method of claim 7, further comprising:
    switching a state of the allocated processor to an 'active state'; and
    returning the state of the allocated processor to an 'idle state' when the processing with respect to the first data is completed.

11. The method of claim 7, further comprising:
    processing the first data, and, when the processing of the first data is completed, searching for the sequence number of the first data with reference to the sequence database; and
    recording a previous sequence number of the retrieved sequence number in the sequence database.

12. The method of claim 7, further comprising:
    allocating, to the first data, a processor that is not operating among the plurality of processors without determining the sequence number of the first data, when the data is not processed; and
    outputting the first data processed by the allocated processor regardless of the sequence number.

* * * * *